US007734748B1

(12) United States Patent
Durairaj et al.

(10) Patent No.: US 7,734,748 B1
(45) Date of Patent: Jun. 8, 2010

(54) METHOD AND APPARATUS FOR INTELLIGENT MANAGEMENT OF A NETWORK ELEMENT

(75) Inventors: Ramesh Durairaj, Santa Clara, CA (US); Tal Lavian, Sunnyvale, CA (US); Phil Yonghui Wang, Nepean (CA)

(73) Assignee: Nortel Networks Limited, St Laurent, Quebec (CA)

( * ) Notice: Subject to any disclaimer, the term of this patent is extended or adjusted under 35 U.S.C. 154(b) by 1534 days.

(21) Appl. No.: 10/678,705

(22) Filed: Oct. 3, 2003

(51) Int. Cl.
*G06F 11/00* (2006.01)
*G06F 15/177* (2006.01)
*G06F 15/173* (2006.01)
*G06F 3/00* (2006.01)

(52) U.S. Cl. .......................... 709/223; 710/23; 714/23; 709/220; 709/221; 709/222; 709/224

(58) Field of Classification Search ......... 709/220–224; 710/23; 714/23
See application file for complete search history.

(56) References Cited

U.S. PATENT DOCUMENTS 6,311,321 B1 * 10/2001 Agnihotri et al. ........... 717/120
6,535,924 B1 * 3/2003 Kwok et al. ................. 709/242
7,111,201 B2 * 9/2006 Largman et al. ............. 714/36
7,137,034 B2 * 11/2006 Largman et al. ............. 714/23
7,359,993 B1 * 4/2008 Durairaj et al. ............. 709/250
2003/0079055 A1 * 4/2003 Chen ............................ 710/1

OTHER PUBLICATIONS

Mumoto, Enzo et al. "A Hard Real-Time Kernel for Motorola Microcontrollers". 23rd Int. Conf. Information Technology Interfaces ITI 2001, Jun. 2001. pp. 75-80.*

* cited by examiner

*Primary Examiner*—Philip J Chea
(74) *Attorney, Agent, or Firm*—Anderson Gorecki & Manaras LLP

(57) ABSTRACT

A network element (NE) includes an intelligent interface (II) with its own operating environment rendering it active during the NE boot process, and with separate intelligence allowing it to take actions on the NE prior to, during, and after the boot process. The combination of independent operation and increased intelligence provides enhanced management opportunities to enable the NE to be controlled throughout the boot process and after completion of the boot process. For example, files may be uploaded to the NE before or during the boot process to restart the NE from a new software image. The II allows this downloading process to occur in parallel on multiple NEs from a centralized storage resource. Diagnostic checks may be run on the NE, and files, and MIB information, and other data may be transmitted from the II to enable a network manager to more effectively manage the NE.

16 Claims, 3 Drawing Sheets

METHOD AND APPARATUS FOR INTELLIGENT MANAGEMENT OF A NETWORK ELEMENT

CROSS REFERENCE TO RELATED APPLICATIONS

This application is related to an application entitled Method And Apparatus For Interfacing External Resources With A Network Element, filed on even date herewith, Appl. Ser. No. 10/678,704, the content of which is hereby incorporated herein by reference.

BACKGROUND OF THE INVENTION

1. Field of the Invention

The present invention relates to network elements and, more particularly, to a method and apparatus for intelligent management of a network element.

2. Description of the Related Art

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network.

Network elements occasionally encounter failure due to a hardware problem or, more commonly, due to a problem with software that has been loaded onto the network element to enable the network element to perform advanced functions, such as switching, routing, filtering, and policing functions. The failure may be recoverable, i.e. may be one from which the network element may be restarted over the network. Certain instances of network element failure, however, are not recoverable and may even require a new software image to be loaded onto the network element. Similarly, routine updates to increase the functionality or reliability of the network element may require a new software image to be loaded onto the network element.

Conventional network elements contain a RS232 interface, or an equivalent interface, to enable a network engineer or other person to interface a laptop computer to the network element. Where the interface to the network element is an RS232 interface operating at 9.6 Kilobits per second (Kb/s), uploading a new image to the network element may take a considerable amount of time, especially as software images used by network elements have become increasingly large to accommodate the enhanced functionality expected of modern network elements. Indeed, given the size of current software images, which sometimes exceed 10 s of Mbytes, even where a RS232C port operating at 115 Kb/s is utilized, loading a new software image to the network element may take a considerable amount of time.

More importantly, a standard RS232 or RS232C interface requires the network element to be operational before access to the network element may be obtained. Management of the network element over a communications network, while faster than using a standard RS232 port, is likewise generally impossible in the event of network device failure. For example, where port 162/udp (or another network port) is used to enable a network element to be controlled using Simple Network Management Protocol (SNMP), network element failure generally renders the network element's Management Information Base (MIB) inaccessible. Similarly, an Ethernet port is generally not operable without a full TCP protocol stack. Where the network device is experiencing failure, it may not be possible to load a full TCP stack, thus rendering the Ethernet management port largely useless. This prevents information associated with the failure from being accessible to the management station when it is needed most—during the failure. Accordingly, conventional ports cannot in many situations help a network manager identify and fix problems on network elements without rebooting the network element and trying to recreate or trace, after the fact, the cause of the fault.

SUMMARY OF THE INVENTION

The present invention overcomes these and other drawbacks by providing a method and apparatus for intelligent management of a network element. According to an embodiment of the invention, a network element includes an intelligent interface that has its own microkernel to enable it to be active during the boot process before the network element has entered an operational state, and separate intelligence to enable it to take actions on the network element and interface with the network element prior to, during, and after the boot process. The combination of increased intelligence and independent operation provide enhanced management opportunities to enable the network element to be controlled before and during the boot process, as well as after the boot process has completed and the network element has begun operations in a run time environment.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
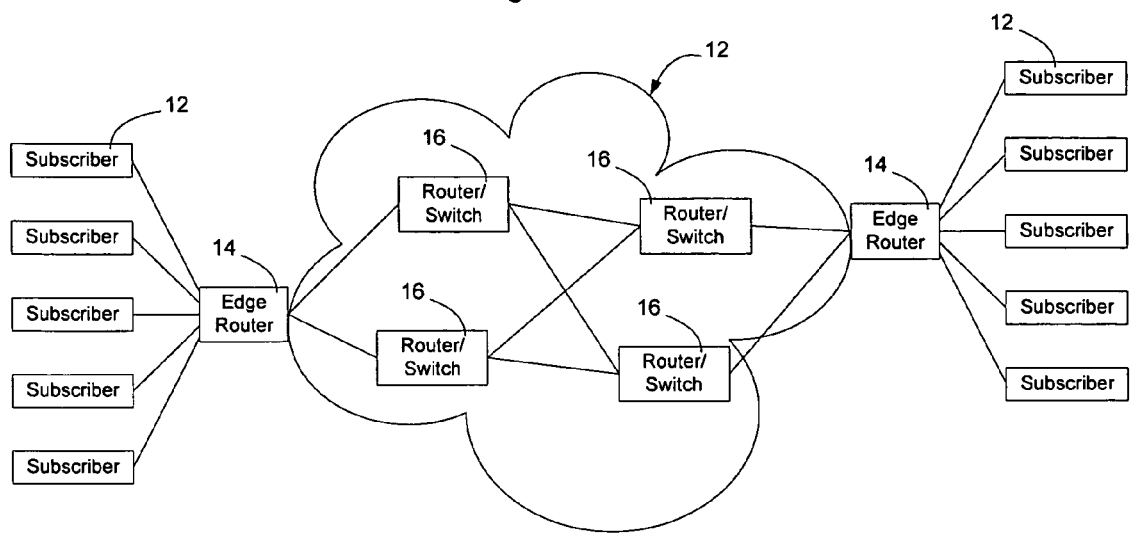
FIG. 1 is a functional block diagram of an example of a communication network architecture.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, according to an embodiment of the invention, an intelligent interface for a network element includes a processing environment to enable the intelligent interface to boot with, or separately from, the network element. By providing an intelligent interface with the ability to boot separately from the network element, the intelligent interface may be made available during the boot process or where the network element is not capable of booting so that it can alter and monitor the boot process and to control the network element during the boot process. The intelligent interface may also be utilized to enhance the operational capabilities of the network element by providing access to additional resources such as external storage, security services, and other external resources.

Providing an intelligent interface with its own processing capability and an external communication port enables software to be uploaded to the network element during the boot process before restarting the network element, for example, with a new boot software image. Similarly, log files, Management Information Base (MIB) variables, and other data associated with the network element may be downloaded through the intelligent interface to a network manager in order to more effectively manage the network element.

The availability of the external port also makes it possible to run diagnostic checks on the network element during the boot process. For example, a network administrator may run traps or view variables indicative of actions being performed by the network element during the boot process. Providing the ability to view the boot process from an outside perspective may provide the network administrator with insight as to the likely source(s) of a problem that may be causing the network element to malfunction.

The network element may be interfaced over the intelligent interface by a network engineer using a laptop computer. Alternatively, the network element may be connected over the intelligent interface to a separate management network, which is not a part of the data transport network served by the network element. In this embodiment, it is possible to enhance management functionality by securing, or separating, the management traffic from data network traffic. This enhances network security since it prevents the network element from being controlled over the network by spurious instructions from unauthorized or unintentioned individuals. Further, separating the management function from the data transport network enables enhanced management activities to take place. For example, connecting network elements together in a management area network enables a software image to be loaded locally onto a central image storage area. That image can then be retrieved, periodically or during the boot process, by the intelligent interface and used in the boot process of the network element. Accordingly, utilization of a separate management network facilitates deployment of new software images simultaneously to multiple network elements through their intelligent interfaces.

Additionally, while the network element is running, a new software image may be downloaded to the network element and stored in the intelligent interface. This new software image can then be used during a subsequent reboot to accelerate the loading of a new software image onto the network element and minimize the down-time associated with performing the software image upgrade. By connecting the intelligent interface with a central management console, a new software image may be upgraded to network elements throughout the network by loading the image on the network management console and instructing the management console to transmit the new image to the connected intelligent interfaces, or instructing the intelligent interfaces to request a new image from the management console.

In the intelligent interface, a separate processing environment enables the intelligent interface to take actions on the network element before, during, and after the network element has become fully active. This enables the intelligent interface to store information for use by the network element and to control the network element. This also enables the intelligent interface to look at the internal configuration of the network element more closely to provide insight into how the network element is performing under normal operating conditions, which might be significantly different than how the network element performed in simulated setups in the laboratory during development. Using an intelligent interface enabled to act on its own, and with enough speed to communicate with a central management system enables real-time debugging and may result in better performance and new enhancements.

The intelligent interface of the network element in addition to being useful in connection with and during the boot process, may also be utilized during run-time to enhance the features of the network element. For example, the intelligent interface may serve as an interface to external storage, central logging facilities, security services, and many other external resources.

Network elements that are provided with storage facilities generally utilize a relatively low volume storage facility, such as a Personal Computer Memory Card International Association (PCMCIA)-based storage card. Some high end network elements also include built-in hard disc storage facilities. By enabling the intelligent interface to provide access to external storage, additional storage resources can be made accessible to the network element. The external storage may be any commercially available conventional USB-based storage solution. The extra storage can help the network element maintain alternate software images and configuration files, runtime log files, local statistics collection information, and many other types of information.

One recent trend is to maintain logs sufficient to trace whether a particular packet has been handled by a network element. Although hash functions and other compression techniques are used to maintain records of which packets have been handled by the network element, the sheer number of packets handled by a network element necessitates the network element to have access to a large capacity storage resource. Enabling the intelligent interface to transmit log information via its external storage port enables much of this data, which generally will not be used by the network element once created, to be exported to mass external storage solutions.

Another protocol that requires significant storage capabilities is Remote MONitoring (RMON) which is an extension to SNMP that enables alarms to be generated based on statistical analysis of traffic conditions, including specific types of errors. RMON 2 can also monitor the kinds of application traffic that flow through the network. Due to the comprehensiveness of the capabilities of RMON, the storage requirements can get quite intensive. Providing external storage, through the intelligent interface, enables enhanced RMON monitoring to take place. Additionally, the alarm and statistics monitoring can take place external to the network element to further simplify the software image required on the network element.

According to one embodiment of the invention, the intelligent interface may serve as an interface to external resources during the run-time of the network element. For example, the intelligent interface may serve as an interface to external data storage so that additional storage may be provided to the network element when the port is not in use as a management interface. In this embodiment, the intelligent interface may be made to look like a standard memory resource to the network element, even though it is in actuality an access to an external memory resource. This enables external storage, such as a disc or an array of discs, to be used to supplement the standard flash memory resident in many network elements. Optionally, several network elements may be connected via the intelligent interface to a common storage facility, a resources area network, or to a storage area network.

According to another embodiment of the invention, the intelligent interface may also be used to log events occurring during runtime, at a network outage, or while the network element is being interfaced in a management context. Typically, network events are logged by transferring information over the network. When the network is down, it may not be possible to log events through TCP transmissions. Additionally, the small amount of memory resident in a conventional network element that has been allocated to logging events may be insufficient, thus providing a potential security lapse and limiting the usefulness of the logging facility. Utilizing the intelligent interface to log events during runtime or during a network outage enhances the security of the network elements by allowing greater numbers of events to be logged and by disassociating logging from the status of the communications network on the network element is designed to operate. Additionally, where the intelligent interface is connected to a management area network or a resources network, since the intelligent interface is active and transmitting information on a network other than the network that is experiencing a failure, the log may be made available during network outages.

Enabling enhanced security is also important for a network element. Current security mechanisms generally involve a password, SNMP access string, Remote Authentication Dial In User Service (RADIUS)-based access mechanisms, or the use of Rivest-Shamir-Adleman (RSA)-based access mechanisms available from commercial vendors such as RSA security. By providing an intelligent interface, it is possible to interface these or other enhanced security services to the network element, such as biometric or token-based security services. This also allows security functionality to be off-loaded from the network element to another device or to the intelligent interface itself, so that the resources of the network element may be more fully utilized to perform network switching and routing functions. Other functions such as interaction with external environment sensor monitors, e.g. fire sensors, for initiating a disaster recovery operation preemptively and intelligently may be performed as well, and the invention is not limited to an intelligent interface configured to implement only the above-described functions.

The physical interface of the external port of the intelligent interface, in one embodiment, is designed to be considerably faster than a standard RS232 port, to facilitate downloading larger software images to the network element and transferring larger volumes of data from the network element. For example, the physical interface may be based on one of the Universal Serial Bus (USB) standards, such as USB 1.0 configured to operate at 1.5 Megabits per second (Mb/s), USB 1.1 configured to operate at 12 Mb/s, or USB 2.0 configured to operate at 480 Mb/s. The invention is not limited to implementation of one of these three USB standards, however, as other data transfer rates may be used as well, especially as technology develops.

The intelligent interface may include independent memory to further enhance the capabilities of the intelligent interface by enabling information such as a new software image to be stored in the intelligent interface. Storing a new software image in the independent memory subsystem of the intelligent interface allows an updated image or a backup (last known good image) to be stored and utilized in the event of a corruption in the main software image in use on the network element. The memory subsystem of the intelligent interface may be used during run-time to catch and store state information associated with flows being handled by the network element, to catch and store a back-up software image for use in the event that there is an error encountered by the network element, or to store many other pieces of information downloaded to the network element or generated by the network element. For example, the memory subsystem may store a copy of the Management Information Base (MIB) to make a history of MIB variables available in a run-time environment, as well as making the MIB available for inspection in the event of a network element failure.

The intelligent interface may include its own source of power, such as a battery, fuel cell, or other electric power supply, to enable it to be used in situations where power is not available from the network element. For example, it may be desirable to be able to load software onto the network element, store the software in Random Access Memory (which requires power to maintain its content) and then install the network element on the communications network. Providing an independent source of power enables the software to be loaded and stored on the network element before the network element is plugged into a power supply or booted, and hence a software image may be pre-loaded on the network element. It also enhances the Hot-standby and fail-over recovery functions as it enables information stored in the network element to be retrieved after a power failure, which could otherwise cause the network element to lose information such as state information associated with services being provided by the network element, and management information stored in the network element's MIB. Maintaining the state information may allow the network device to be brought up more quickly after a power failure, and may enable the connections serviced by the network device to be more quickly restored once the network device is brought into an operational condition. Additionally, where the network element has a corrupted image and is unable to boot, providing a separate power supply enables the software image to be corrected or replaced even where, for example, it would otherwise be impossible to access the software image since the network element will not allow the network processor to be supplied with power.

FIG. 1 illustrates a simplified example of a communication network 10. As illustrated in FIG. 1, subscribers 12 access the network 10 by interfacing with a network element such as an edge router 14 or other construct typically operated by an entity such as an internet service provider, telephone company, or other connectivity provider. The edge router collects traffic from the subscribers and multiplexes the traffic onto the network backbone, which includes multiple routers/switches 16 connected together. Through an appropriate use of protocols and exchanges, data may be exchanged with other subscribers or resources may be accessed and passed to the subscribers 12.

Figure 2:
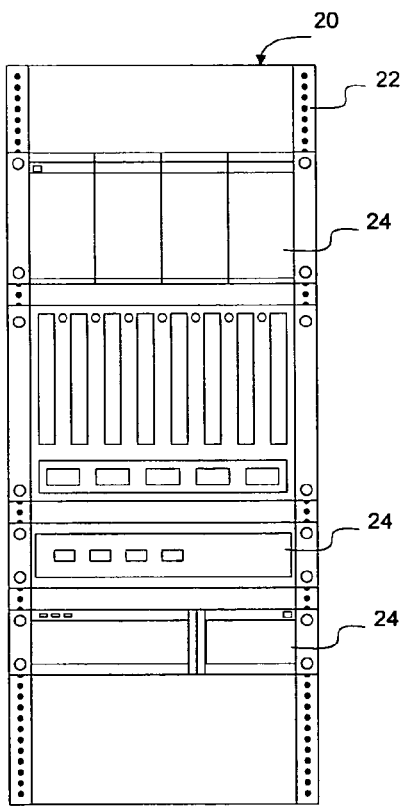
FIG. 2 is a block diagram of a rack containing network elements according to one embodiment of the invention.

Often, a network provider will maintain a central office or other processing facility in which multiple network elements are housed together in a rack. FIG. 2 illustrates one embodiment of a rack that may be used to house several network elements. As shown in FIG. 2, a rack 20 is typically configured with mounting strips 22 on either side such that multiple network elements 24 may be housed in the rack 20. By vertically stacking network elements 24 in this manner, it is possible to increase the number of network elements 24 that may be housed in a given room while optionally enabling shared power distribution and other sundry benefits. The physical proximity of network elements according to an embodiment of the invention provides an opportunity to create a management area network or resources network as described in greater detail below. The network elements may be edge routers 14, router/servers 16, or other network elements configured to operate or perform specific functions on the communications network 10.

Figure 3:
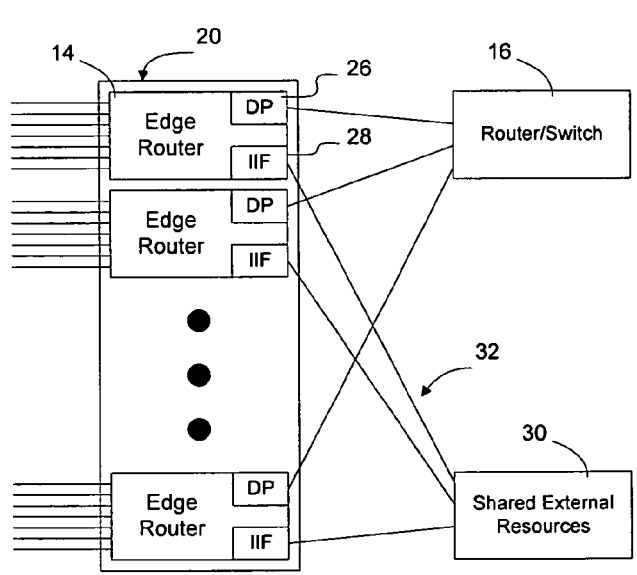
FIG. 3 is a functional block diagram of several network elements connected to both a data network and a management network according to an embodiment of the invention.

FIG. 3 illustrates an example of a resources/management area network interconnecting network elements with a shared external resources such as storage resources or a management station. The shared external resources may be contained in the rack 20, or maintained in another convenient location. The network elements are also connected to a data network configured to handle traffic passing through the network elements and the router/switch. As shown in FIG. 3, edge routers 14, or other network elements, may be connected to two networks. Specifically, as shown in FIG. 3, the network elements may be connected through data ports 26 to one or more network elements configured to operate in a data communications network 10, and may be connected through intelligent interfaces 28 to shared external resources 30 over a network 32. In the embodiment illustrated in FIG. 3 the network 32 involves point-point connections between the shared external resources 30 and the managed network elements 14. The invention is not limited to this embodiment as the network 32 may be more extensive, itself involving network elements configured to switch/route traffic. The shared external resources may be an external memory, security device, a management station, or any combination of these and other external resources.

Figure 4:
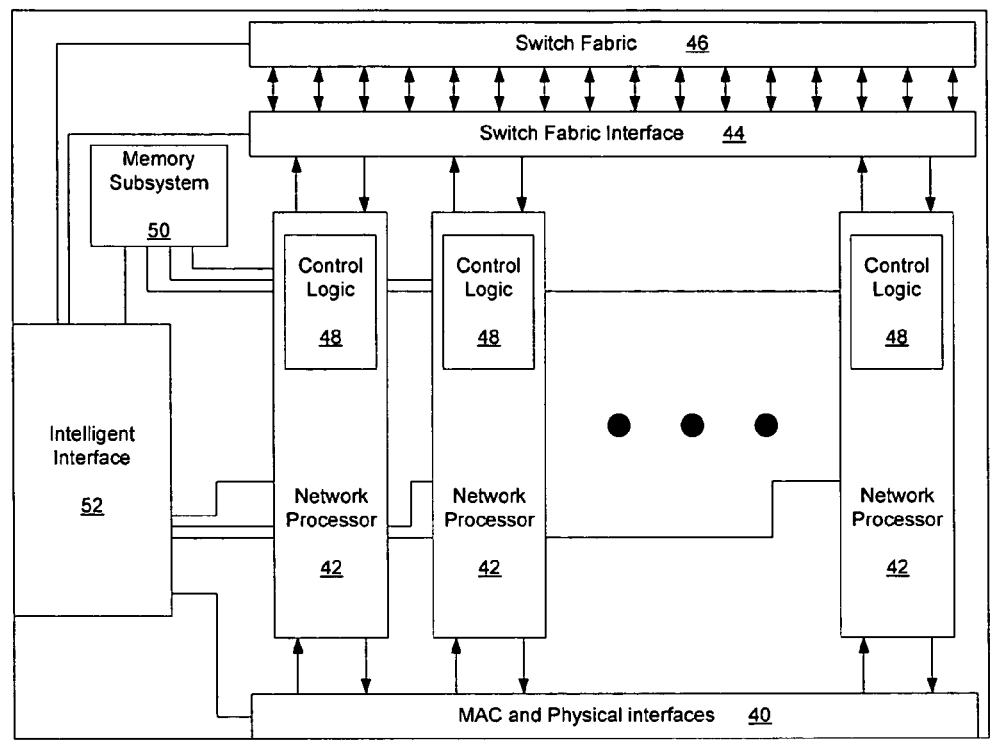
FIG. 4 is a functional block diagram of a network element containing an intelligent interface according to an embodiment of the invention.

FIG. 4 illustrates one example of a network element. In the embodiment of FIG. 4, packets are received at the MAC/PHYsical interface 40, assembled, and passed to a network processor 42. The network element may have multiple network processors as shown, or a single network processor depending on its design. The invention is not limited to any particularly configured network element. The network processor 42 performs various operations on the packets, such as filtering, and policing, and makes forwarding/switching decisions based on the header information contained in the packet. The packets are then passed to the switch fabric interface 44 and through the switch fabric 46 which directs the packets within the network element so that they can subsequently exit the network element via an appropriate MAC/PHY interface. Optionally, the packets may be sent back through the network processor 42 a second time to enable the network element to perform additional operations on the packets, such as queuing, disassembly, and other standard operations.

The network processors contain control logic 48 configured to enable the network processors to implement a processing environment, execute instructions to process packets flowing through the network element, and otherwise to enable the network element to perform functions required of it to communicate on the network. The instructions associated with the separate processing environment and to be executed by the network element typically are contained in a software image resident in a memory subsystem 50 on the network element.

The control logic 48 may be implemented, as shown, as a set of program instructions that are stored in a computer readable memory 50 within the network element and executed on a microprocessor within the network element. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

According to an embodiment of the invention, an intelligent interface 52 is provided to enhance the functionality of the network element while allowing increased management opportunities. As described in greater detail below, the management interface according to one embodiment of the invention includes a USB port to enable high-rate data transfers between the network element and external resources. According to another embodiment, the intelligent interface includes its own processing environment having an independent kernel to enable it to be active even when there is a failure associated with one or more of the network processors in the network element. According to yet another embodiment, the intelligent interface is configured to allow the network processor to have access to external resources as though included in the network element. Thus, according to this embodiment, peripheral resources such as security modules, storage, and management consoles, may be accessed directly by the network processors through the intelligent interface. The invention is not limited to these particular uses of the intelligent interface.

Figure 5:
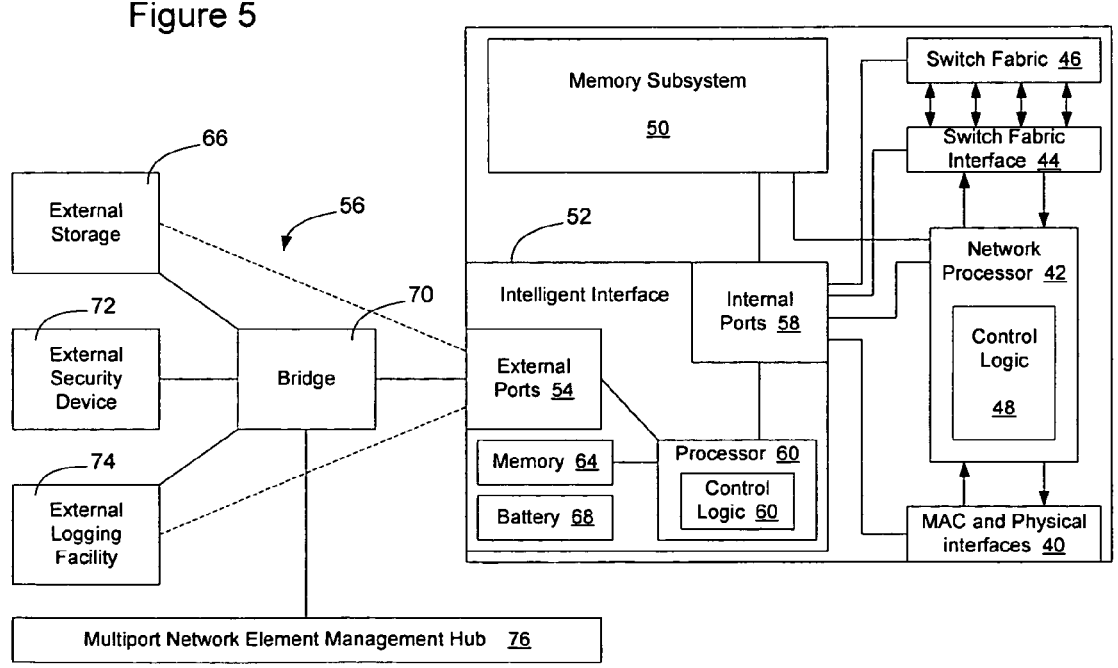
FIG. 5 is a functional block diagram of a network element containing an intelligent interface connected to external resources according to an embodiment of the invention.

FIG. 5 illustrates one example of a network element including an intelligent interface according to an embodiment of the invention. As shown in FIG. 5, an intelligent interface according to an embodiment of the invention includes external ports 54 configured to interface with external resources 56. In one embodiment, the external ports 54 are compliant with one of the Universal Serial Bus (USB) standards, such as USB 1.0, USB 1.1, USB 2.0, or USB 2.1, although the invention is not limited to this embodiment.

The intelligent interface also includes internal ports 58. The internal ports may simply be connections to an internal bus in the network element, an network element management bus, or another internal connection that may be used to communicate with components internal to the network element. According to one embodiment of the invention, the internal ports are configured to enable the intelligent interface to be connected to a standard PCI bus. In this embodiment, the intelligent interface may be configured as a module based system that can be readily plugged into an existing system, either on the backplane or as a piggyback connection on any PCI-based switch fabric/CPU card. The invention is not limited to an intelligent interface configured to interface with a PCI bus, however, as the intelligent interface may be configured to interface with any internal data transfer structure/hierarchy.

The internal ports connect the intelligent interface intelligence to the network element's internal CPU/configuration management subsystem to enable new software images to be implemented on the network element. The internal ports also enable the intelligent interface to receive statistics from and monitor information from different network element subsystems.

A processor 60 containing control logic 62 is provided to enable the intelligent interface to implement a processing environment and execute instructions independent of the processing environment of the network element. The processor 60 and attendant kernel and software subsystems are described in greater detail below in connection with FIGS. 6-7. Enabling the intelligent interface to execute instructions independently in its own operational environment enables the intelligent interface to be active when the network element is not able to assume an active state, such as in the event of a serious failure or before the network element has been booted.

The intelligent interface also includes a memory 64 to enable it to store information independent of the main memory subsystem 50 of the network element. Providing a memory 64 in the intelligent interface 52 enables the intelligent interface to store information, such as logging information, provided by the network element prior to transmission to a management station. Additionally, as discussed above, the memory may be used to store new software for execution by the network element. By storing new software files or a complete new software image in the intelligent interface memory subsystem, and interfacing with the network processor 42 over the internal port 58, the intelligent interface may cause the network element to boot from a new software image without requiring the network element to first activate its memory subsystem.

In one embodiment, the internal port 58 connects the intelligent interface to the network element internal memory management subsystem 50, and contains kernel supported intelligent logic to mount an internal 64 or external 66 memory resource and interface it with the network element's memory management unit 50 to make the external memory resource 66 or intelligent interface memory resource 64 appear as a local memory resource to the network element.

As discussed above, the management interface optionally may include a battery 68, fuel cell, capacitor bank, or other source of independent power to enable the management interface to be operational before power is supplied to the network element, or in the event of a power outage or shortage.

The external ports may be connected directly, or through a bridge 70, to one or more external resources. As shown in FIG. 5 and as discussed above, the intelligent interface may be connected to external storage 66, an external security device 72, an external logging facility 74, a multiport network element management hub 76, or other peripheral resources or management resources. Optionally, the USB port may include a built-in bridge or multiple physical interfaces to enable it to support any number of external resources, such as USB storage sticks, biometric sensors, management stations, etc. Each of these resources enables the functionality of the network element to be increased, without requiring the network element to be modified. Accordingly, the network element is able to interface with peripherals through the intelligent interface to offer increased functionality without requiring the network element to contain dedicated circuitry configured to perform the desired functionality. While four external resources have been shown in FIG. 5, the invention is not limited to any particular number of external resources or set of external resources.

Figure 6:
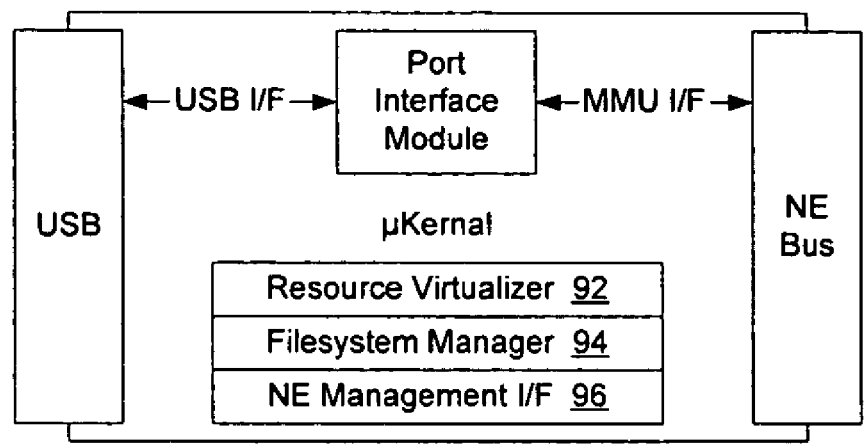
FIG. 6 is a functional block diagram of a software environment that may be configured to run on an intelligent interface according to an embodiment of the invention.

FIG. 6, illustrates a software environment configured to be instantiated on the intelligent interface of FIGS. 4 and 5 according to an embodiment of the invention. In the embodiment illustrated in FIG. 6, the software environment includes a microkernel supporting a software module referred to herein as a port interface module, which is described in greater detail below in connection with FIG. 7, and three primary software subsystems: a resource virtualizer 92, a file system manager 94, and a network element management interface 96. The invention is not limited to an embodiment that implements this particular selection of software subsystems.

The resource virtualizer 92, in this embodiment, is responsible for memory and storage resource virtualization, which makes intelligent interface memory resources 64 and external memory resources 66 appear to be local resources to the rest of the network element. Where the storage is a locally attached resource, and the network element is providing multiple services for multiple subscribers, the resource virtualizer may be configured to partition the storage resources to make the storage resource appear as a dedicated resource to each subscriber or group of subscribers. The ability to make the resource appear as dedicated to each customer prevents one customer from having access to another customer's data, thereby enhancing security and enabling the network element to provide enhanced Virtual Private Network (VPN) services.

The filesystem manager 94 is a subsystem that is configured to perform resources management. The filesystem manager 94 works below the resources virtualizer and is responsible for administering the local or remotely connected storage resources. The filesystem manager subsystem also provides added security features to prevent spurious, unauthorized resource access.

The network element management interface subsystem 96 enables the network element to be effectively integrated with the core network element management software. This enables the intelligent interface to be utilized to provide extra resources to the management software and participate in management functions, such as uploading new software images, maintaining log files, accessing MIB information, and other management functions as described in greater detail above.

Figure 7:
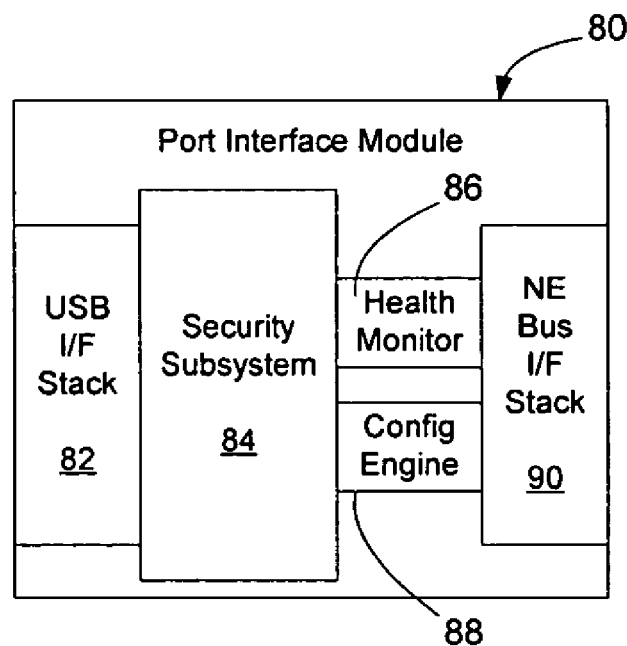
FIG. 7 is a functional block diagram of software that may be configured to implement a port interface module for use in the software environment of FIG. 6 according to an embodiment of the invention.

FIG. 7 illustrates one example of software that may be configured to implement a port interface module that may be used in connection with the intelligent interface according to embodiments of the invention. In the illustrated embodiment, the port interface module includes a USB interface stack 82, a security subsystem 84, a health monitor 86, a configuration engine 88, and a stack to interface with the network element bus or communications subsystems 90. The port interface module executes in an operational environment supported by a microkernel instantiated on a processor, such as the processor 60 of FIG. 5. The other subsystems configured to operate in the operational environment are described above in greater detail in connection with FIG. 6.

As shown in FIG. 7, the health monitor 86 connects to the network element bus through the internal bus interface stack 90 and monitors the health of the network element. This module is responsible for intelligent health checks and status gathering of all the vital signs of a network element. The health monitor provides an interface for customizing the parameters of users' interests that need monitoring. This module is also responsible for archiving and reporting back any alarm conditions.

The configuration engine 88 interfaces with the network element bus through the internal bus interface stack 90 and enables the intelligent interface to take corrective action on the network element on demand or when the health monitor indicates that corrective action is warranted. This module provides an always available access to the network element configuration to correct or to roll out important configuration changes. Configuration changes may be intelligent to make configuration parameters active/non-active based on different preset conditions.

The health monitor 86 and configuration engine 88 are integrated tightly with a security subsystem 84 so that information cannot be transmitted from the health monitor and instructions cannot be issued to the configuration engine without first causing the attempted transaction to pass through the security subsystem.

In the embodiment of the invention shown in FIG. 6, the security subsystem 84 is provided to prevent unintended action from being taken on the network element through the intelligent interface. The security subsystem may require interaction with an external security peripheral, or may access information resident in the intelligent interface memory subsystems 64, 66 to ascertain if an attempt to access the network element through the intelligent interface is authorized, the entity attempting to access is authenticated, and to maintain an account of the type of access that was attempted and/or granted.

The network element bus interface 90 may be configured to include a protocol stack to enable the intelligent interface to interface with a PCI bus or backplane, Small Computer System Interface (SCSI) bus or backplane, or any other standard bus/backplane technology.

The USB interface (I/F) stack is provided to enable the intelligent interface to exchange information over an external USB port. The universal I/F stack subsystem provides a transparent I/F layer to the physical I/F mechanisms. Although this invention has been described in connection with implementing one of the USB protocols, the I/F stack may also implement several different protocols, depending on the type of external port, the type of communication being attempted over the external port, and the nature of the data to be transmitted over the external port. For example, in other embodiments the external physical port may implement one of the 802.11 protocols, Firewire, Bluetooth, or any number of other physical layer transmission protocols.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A router, comprising:
a plurality of physical interfaces for receiving data from the network and assembling packets of data, a first processor supporting a first processing environment, at least one network processor for processing the packets of data, a switch fabric for switching the packets of data between physical interfaces, so that the router may receive data from the network, assemble the data into packets, process the packets, switch the packets, and then output at least some of the packets of data back onto the network;
an intelligent interface between the first processing environment and a management device external to the router, said intelligent interface being an interface other than one of the plurality of physical interfaces and comprising a second processor supporting a second processing environment independent of the first processing environment, the second processor being able to boot independent of a boot process of the first processing environment, an internal interface enabling the first processing environment to be accessed from the second processing environment, and an external interface connected to the second processing environment to enable the second processing environment to be accessed from the management device external to the router;
wherein the intelligent interface is configured to serve as an interface between the first processing environment and external resources during the run-time of the router to provide access for the first processing environment to at least one of an external storage facility, an external security device, and an external logging facility.

2. The router of claim 1, wherein the first processing environment comprises a first kernel, and wherein the second processing environment comprises a second kernel.

3. The router of claim 1, wherein the second processor further comprises control logic enabling a new software image to be loaded onto the intelligent interface, said new software image to be used by the second processing environment to configure the first processing environment.

4. The router of claim 3, wherein the intelligent interface comprises a memory, and wherein the new software image is stored in said memory.

5. The router of claim 1, wherein the second processor comprises control logic enabling information related to an operational condition of the first processor to be collected over the internal interface and transmitted over the external interface.

6. The router of claim 5, wherein the operational condition comprises at least one of Management Information Base values, logging information, and operational parameters.

7. The router of claim 5, wherein the second processor comprises control logic configured to enable diagnostic checks to be run on the first processing environment.

8. The router of claim 5, wherein the second processor comprises control logic enabling modifications to be made to the first processing environment over the internal interface.

9. The router of claim 1, wherein the external interface operates utilizing at least one of the Universal Serial Bus (USB) standards.

10. An intelligent management interface for a router, the router including at least one router processor controlling operation of the router in normal operation, the router further including physical interfaces and a switch fabric to receive data from the network, switch the data between the physical interfaces, and output the data back onto the network, the intelligent management interface comprising:
at least one port implementing a Universal Serial Bus (USB) standard and being an interface other than one of the plurality of physical interfaces;
at least one intelligent management interface processor supporting an independent operating environment for the intelligent management interface which is separate from the operating environment supported by the at least one router processor and which is able to boot separate from a boot process of the at least one router processor, the independent operating environment enabling the intelligent management interface to be active during the boot process of the at least one router processor; and
intelligence enabling the intelligent management interface to take actions on the router to control the boot process of the at least one router processor, the intelligence further being configured to enable the intelligent management interface to be available during run-time of the route processor to provide external access for the route processor to at least one of an external storage facility, an external security device, and an external logging facility.

11. The intelligent management interface of claim 10, wherein the intelligence performs diagnostic checks on the router.

12. The intelligent management interface of claim 10, wherein the intelligence uploads files to the router.

13. The intelligent management interface of claim 10, wherein the intelligence causes a new software image to be stored on the intelligent management interface, and causes the router to be restarted from the new software image.

14. The intelligent management interface of claim 10, wherein the intelligence controls the router before, during, and after a router boot process.

15. The intelligent management interface of claim 10, wherein the intelligence causes at least one of files and Management Information Base (MIB) information to be transmitted from the intelligent management interface to enable a network manager to manage the router during at least one of a router boot process and in a router run-time environment.

16. The intelligent management interface of claim 10, wherein the intelligence implements a Universal Serial Bus (USB) stack to enable the intelligent management interface to communicate over the USB port utilizing at least one of the USB standards.

* * * * *